United States Patent
Kojima et al.

(10) Patent No.: US 8,309,202 B2
(45) Date of Patent: Nov. 13, 2012

(54) HARD-COATED FILM, METHOD FOR PRODUCTION THEREOF AND ANTIREFLECTION FILM

(75) Inventors: Satoshi Kojima, Otsu (JP); Takashi Mimura, Otsu (JP); Yu Abe, Otsu (JP)

(73) Assignee: Toray Industries, Inc., Tokyo (JP)

( * ) Notice: Subject to any disclaimer, the term of this patent is extended or adjusted under 35 U.S.C. 154(b) by 614 days.

(21) Appl. No.: 12/444,497

(22) PCT Filed: Aug. 31, 2007

(86) PCT No.: PCT/JP2007/066966
§ 371 (c)(1),
(2), (4) Date: May 27, 2009

(87) PCT Pub. No.: WO2008/044398
PCT Pub. Date: Apr. 17, 2008

(65) Prior Publication Data
US 2010/0028600 A1 Feb. 4, 2010

(30) Foreign Application Priority Data
Oct. 6, 2006 (JP) .................. 2006-274832

(51) Int. Cl.
*D06N 7/04* (2006.01)
(52) U.S. Cl. ......... 428/141; 428/409; 428/212; 428/142
(58) Field of Classification Search ............... 428/141
See application file for complete search history.

(56) References Cited

U.S. PATENT DOCUMENTS

| | | |
|---|---|---|
| 2005/0008863 A1 | 1/2005 | Mimura et al. |
| 2005/0191456 A1* | 9/2005 | Hashimoto et al. .......... 428/40.1 |

FOREIGN PATENT DOCUMENTS

| | | |
|---|---|---|
| JP | 2-8030 A | 1/1990 |
| JP | 8-197670 A | 8/1996 |
| JP | 2001-301095 A | 10/2001 |
| JP | 2002-241527 A | 8/2002 |
| JP | 2003-75604 A | 3/2003 |
| JP | 2003-205563 A | 7/2003 |
| JP | 2004-341553 A | 12/2004 |
| JP | 2005-254472 A | 9/2005 |
| JP | 2006-231845 A | 9/2006 |
| JP | 2006-231846 A | 9/2006 |

* cited by examiner

*Primary Examiner* — Maria Veronica Ewald
*Assistant Examiner* — Nancy Rosenberg
(74) *Attorney, Agent, or Firm* — Birch, Stewart, Kolasch & Birch, LLP

(57) ABSTRACT

There is provided a hard-coated film that includes a thermoplastic film and a hard coat layer placed thereon, has high surface hardness, is prevented from forming interference iris patterns, does not reduce image sharpness when used for antireflection films, and is prevented from causing screen glittering, external light reflection, or coloration irregularity of reflected light. The hard-coated film includes a polyester film and a hard coat layer placed on at least one side of the polyester film, wherein the hard coat layer has a surface with irregularities, an interface between the polyester film and the hard coat layer has irregularities, and the surface of the hard coat layer has 3D surface roughness parameters including an arithmetical mean deviation of surface Sa of from 15 nm to less than 150 nm and a kurtosis of surface height distribution Sku of from 1.5 to 5.

11 Claims, 3 Drawing Sheets

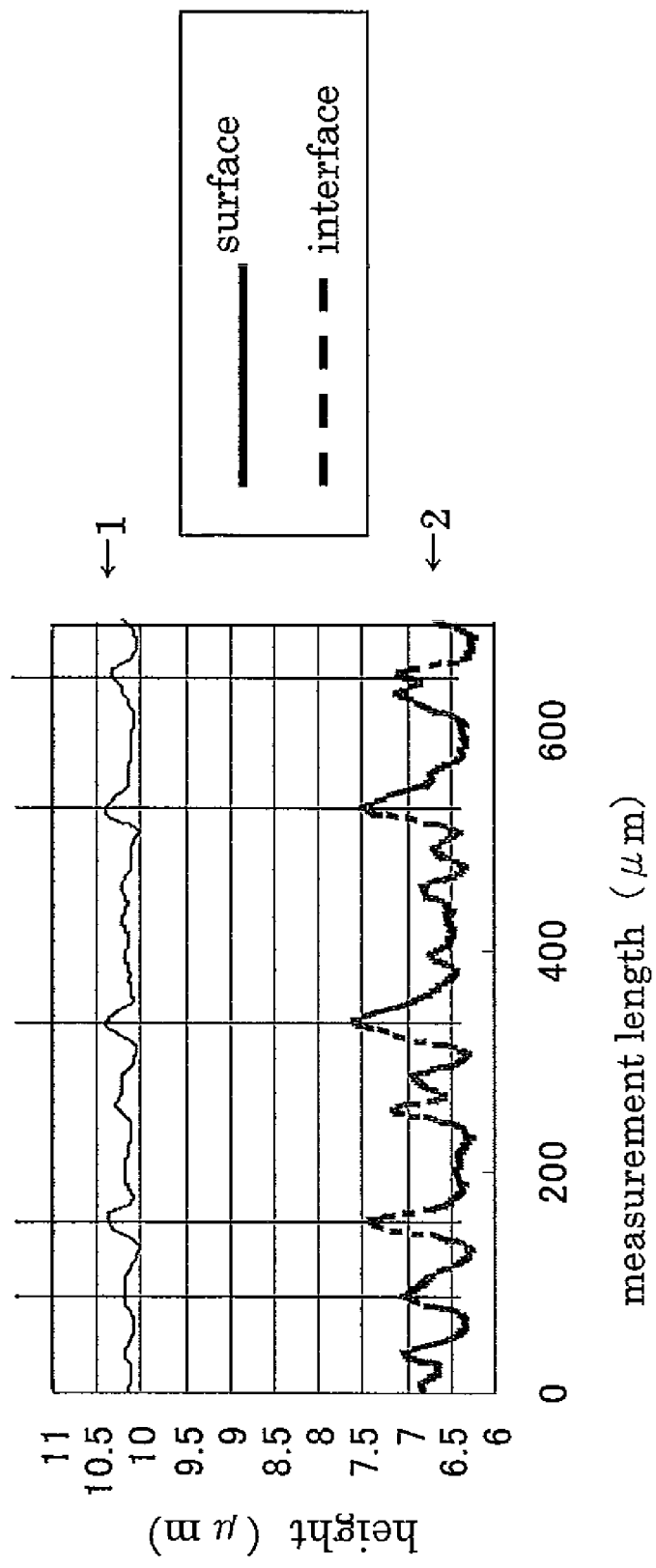

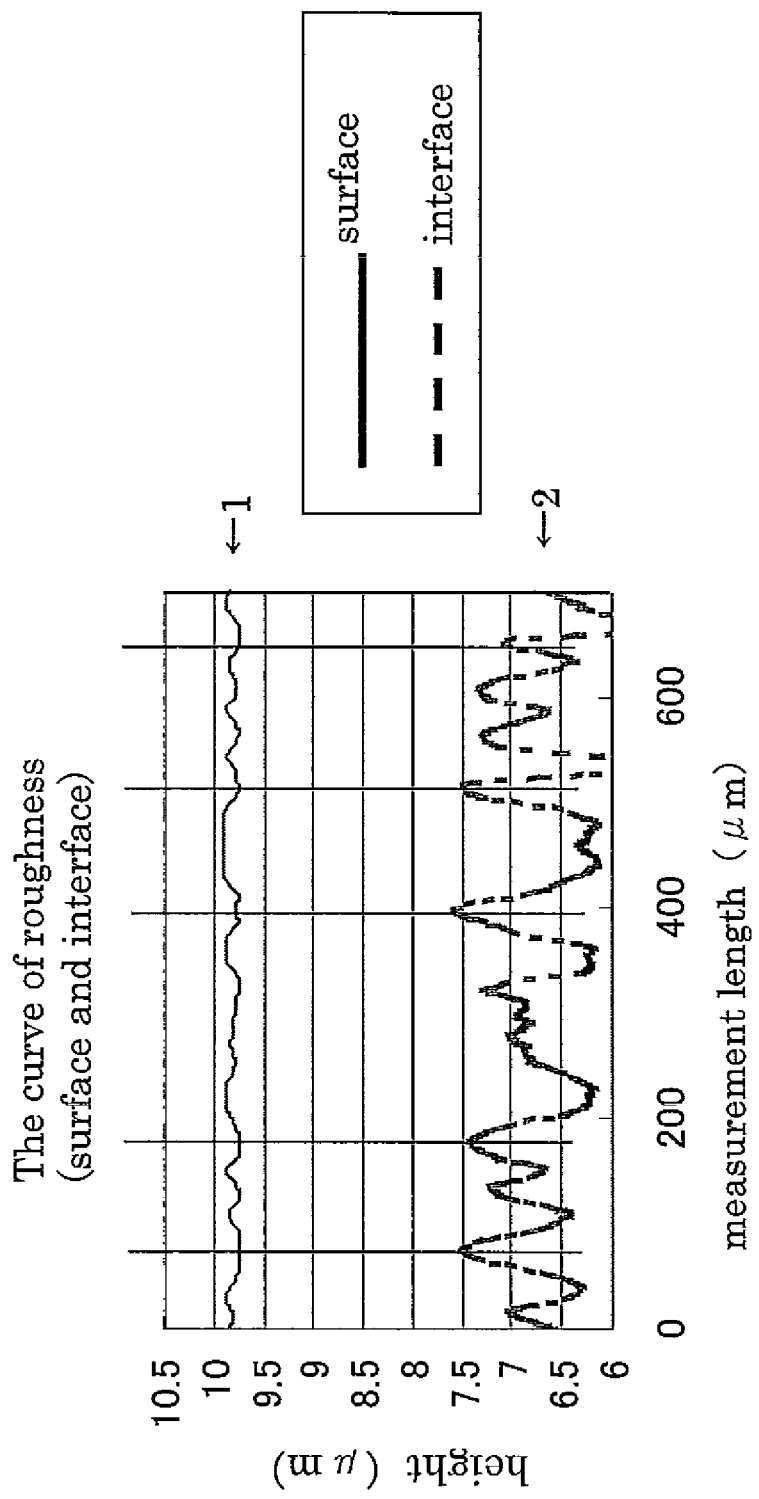
[Fig.2]

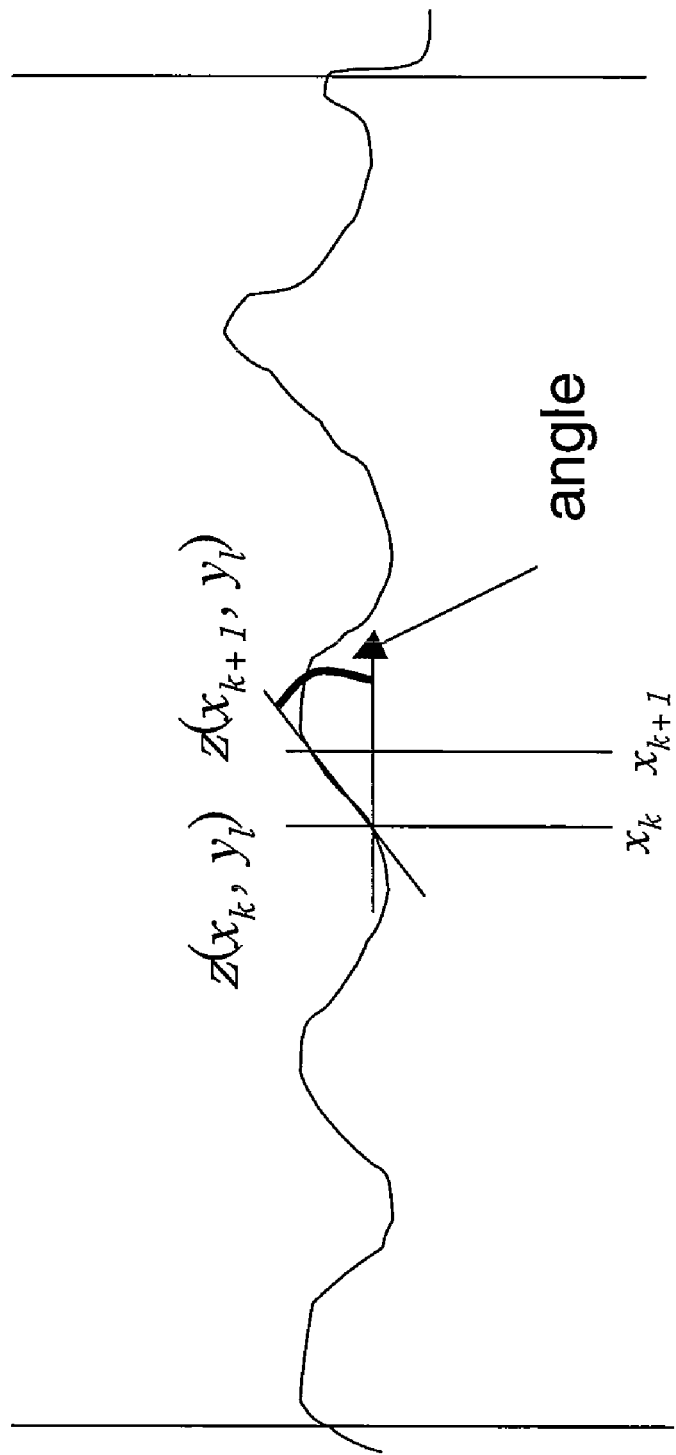
[Fig.3]

HARD-COATED FILM, METHOD FOR PRODUCTION THEREOF AND ANTIREFLECTION FILM

TECHNICAL FIELD

The invention relates to a hard-coated film and a method for production thereof and also to an antireflection film therewith. More specifically, the invention relates to a hard-coated film suitable for use in display antireflection film or touch panel film, characterized in that it has excellent scratch resistance and less interference iris patterns and produces very little coloration irregularity of reflected light after the surface layer is subjected to antireflection treatment, and particularly characterized in that it is effective in preventing reflection, providing transmission image purity, and reducing screen glittering when used as an antireflection film for a plasma display television filter.

BACKGROUND ART

Biaxially-oriented polyester films have advantageous characteristics such as mechanical characteristics, dimensional stability, heat resistance, transparency, and electrical insulating properties and therefore are used for various applications such as magnetic recording materials, packaging materials, electrical insulating materials, a variety of photographic applications, graphic arts, and optical display materials. However, they do not have sufficient surface hardness and therefore have the disadvantage that their surface can be easily damaged by contact, friction, or scratching with other hard materials. In order to solve this problem, conventional techniques use methods of placing various hard coat layers.

Since biaxially-oriented polyester films are highly crystal-oriented, hard coat layers directly provided thereon may have insufficient adhesion. Therefore, methods of providing a hard coat layer on a polyester film through an adhesive layer are generally conducted.

When such methods are used or when a hard coat layer is provided directly on a biaxially-oriented polyester film, a refractive index difference in-plane can be generated between the hard coat layer and the adhesive layer or biaxially-oriented polyester film in contact therewith. Therefore, when such a structure is used as a substrate for optical applications such as antireflection films or touch panel films, interference iris patterns can be generated depending on unevenness in the thickness of the hard coat layer.

In the applications described above, the formation of interference iris patterns significantly inhibits the clear view properties of displays. In order to reduce this phenomenon, the coating thickness accuracy is improved, or the refractive index of the hard coat layer is increased so that the difference between the refractive indices of the hard coat layer and the base film can be reduced (Patent Document 1). Also proposed are a method including the steps of embossing the surface of a base film by hot pressing to form irregularities on the surface and providing a hard coat layer on the embossed surface (Patent Document 2), a method including the steps of using a solvent capable of dissolving a base film to form a hard coat layer-forming coating composition and applying the coating composition to the base film so that the base material can be dissolved or allowed to swell (Patent Document 3), a method of transferring a molding film (Patent Document 4), and a method including the step of adding particles to a hard coat layer to form irregularities for scattering light (Patent Document 5). However, the refractive index of the hard coat layer or the adhesive layer cannot be completely adjusted to about 1.60-1.65, the typical refractive index of biaxially-oriented polyester films, and existing techniques are not satisfactory and cannot completely eliminate interference iris patterns. It is also very difficult to provide a hard coat layer with a uniform thickness such that interference iris patterns can be prevented.

When the method including the steps of forming irregularities on the surface of a base film by hot pressing or the like and providing a hard coat layer thereon is only used, the reflection-suppressing effect cannot be sufficiently achieved, although interference iris patterns can be made slightly less visible. Since biaxially-oriented polyester films have high solvent resistance, few solvents are suitable for the method of dissolving a base film or allowing a base film to swell, and ortho-chlorophenol, the only available solvent, has a problem in which it can pollute the working environment or is not easy to remove. When a mixture layer is formed in the interface between the base film and the hard coat layer, the haze can increase, and the sharpness of the transmitted image from a display using such a technique can be reduced. In this case, since the hard coat layer is made relatively smooth, the external light reflection-reducing effect cannot be expected.

Typical hard coat layers are very smooth. Therefore, when such hard coat layers are subjected to antireflection treatment, the intensity of reflected light from the resulting antireflection layer surface can have a significant wavelength dependency so that a certain color can be strongly visible or color heterogeneity can be caused by unevenness of the antireflection layer coating.

The method of transferring the irregularities of the mold film to the hard coat layer can cause contamination with foreign matter from the mold film and can form irregularities with relatively large slope angles, which can easily cause screen glittering. The method of adding particles to the hard coat layer to form irregularities on the hard coat layer surface can produce the effect of preventing interference iris patterns or reflection but still has a problem in which it can increase screen glittering and therefore reduce clear view properties.

Patent Document 1: Japanese Patent Application Laid-Open (JP-A) No. 2002-241527
Patent Literature 2: JP-A No. 08-197670
Patent Literature 3: JP-A No. 2003-205563
Patent Literature 4: JP-A No. 2004-341553
Patent Literature 5: JP-A No. 2003-75604

DISCLOSURE OF INVENTION

Problem to be Solved by the Invention

An object of the invention is to provide a hard-coated film and an antireflection film therewith that can solve the problems described above, exhibit reduced interference iris patterns or reduced coloration irregularity of surface reflected light, and be effective in producing sharp images, reducing screen glittering, and preventing reflection when used for a front face filter of a plasma display television.

Means for Solving the Problems

Investigations have been made to achieve the object, and as a result, the invention provides the following features:
(1) A hard-coated film, including: a polyester film; and a hard coat layer placed on at least one side of the polyester film, wherein the hard coat layer has a surface with irregularities, an interface between the polyester film and the hard coat layer has irregularities, and the surface of the hard coat layer has 3D surface roughness parameters including an arithmetical mean deviation of surface Sa of from 15 nm to less than 150 nm and a kurtosis of surface height distribution Sku of from 1.5 to 5;

(2) The hard-coated film of (1), wherein the interface between the polyester film and the hard coat layer has irregularities on the polyester film side, and projections of the irregularities on the polyester film side coincide with depressions of the hard coat surface profile in the thickness direction;

(3) The hard-coated film of (1) or (2), wherein the hard coat layer is a thermally hardened layer;

(4) The hard-coated film of any one of (1) to (3), wherein the polyester film contains ultraviolet ray-absorbing agents;

(5) The hard-coated film of any one of (1) to (4), wherein the irregularities of the hard coat layer are formed without the aid of particles in the hard coat layer and the polyester film;

(6) The hard-coated film of any one of (1), (3), (4), and (5), wherein the interface between the polyester film and the hard coat layer has irregularities on the polyester film side, projections of the irregularities on the polyester film side coincide with projections of the hard coat surface profile in the thickness direction, and the hard-coated film has a heat shrinkage ratio of at most 0.8% at 150° C. for 30 minutes in at least one direction;

(7) The hard-coated film of any one of (1) to (6), wherein the hard coat layer surface has an average $\Delta a$ of from 0.2 degrees to 1.0 degree, wherein the average $\Delta a$ is calculated from the formula $\Delta a=(\Delta a1+\Delta a2)/2$, wherein $\Delta a1$ and $\Delta a2$ are arithmetical mean slope angles of the hard coat layer surface in two directions perpendicular to each other, respectively;

(8) The hard-coated film of any one of (1) to (7), wherein the hard coat layer surface has an Sa2/Sa1 ratio of from 2 to 20, wherein Sa1 is the arithmetical mean deviation of surface (Sa) of the hard coat layer surface, and Sa2 is the arithmetical mean deviation of surface (Sa) of the interface between the polyester film and the hard coat layer, concerning the 3D surface roughness parameters;

(9) The hard-coated film of any one of (1) to (8), wherein Sku of the hard coat layer is from 1.5 to 3;

(10) The hard-coated film of any one of (1) to (9), wherein the hard-coated film has a haze of less than 3%;

(11) An antireflection film, including: the hard-coated film of item (1); and a low-refractive-index layer with a refractive index of at most 1.45 that is formed on the hard coat layer of the hard-coated film, optionally with a high-refractive-index layer with a refractive index of at least 1.55 interposed between the hard coat layer and the low-refractive-index layer;

(12) The antireflection film of (11), wherein it has a haze of less than 4% and a transmittance of at most 5% at a wavelength of 380 nm;

(13) A method for producing a hard-coated film, including the steps of: applying a hard coating composition to a polyester film after longitudinal stretching during a polyester film forming process; then slightly stretching the film 1.1 to 1.8 times in the transverse direction, while continuously feeding the film to a tenter; then further stretching the film 2.5 to 3.5 times; and then relaxing the film by 3% to 7% in the transverse direction, while the hard coat layer is thermally hardened; and

(14) The method of (13), further including the step of relaxing the film by 1.5% to 15% in the longitudinal direction and/or the transverse direction at 200° C. to 240° C. after the relaxation by 3% to 7%.

Effects of the Invention

The hard-coated film and the antireflection film of the invention each having any of the features described above exhibit reduced interference iris patterns and reduced coloration irregularity of surface reflected light after the antireflection treatment. Therefore, when they are used for display applications or the like, a high level of clear view properties are provided, and when used for a front face filter of a plasma display, they each have the effect of preventing reflection, provide a high level of clear view properties, keep images sharp, and prevent screen glittering.

BRIEF DESCRIPTION OF THE DRAWINGS

FIG. 1 shows the relationship between the irregularities of the hard coat layer surface and the irregularities of the interface between PET and the hard coat layer, in which projections of the hard coat layer surface coincide with projections of the polyester film surface in the interface with the hard coat layer.

FIG. 2 shows the relationship between the irregularities of the hard coat layer surface and the irregularities of the interface between PET and the hard coat layer, in which depressions of the hard coat layer surface coincide with projections of the polyester film surface in the interface with the hard coat layer.

FIG. 3 is a diagram schematically showing the arithmetical mean slope angle ($\Delta a$) in an embodiment of the invention.

DESCRIPTION OF REFERENCE SYMBOLS

In the drawings, reference numeral 1 represents a hard coat surface and 2 a polyester surface.

BEST MODE FOR CARRYING OUT THE INVENTION

The hard-coated film of the invention including a polyester film and a hard coat layer placed on at least one side of the polyester film or the antireflection film therewith is characterized in that the surface of the hard coat layer and the interface between the polyester film and the hard coat layer each have irregularities, the surface of the hard coat layer has 3D surface roughness parameters including an arithmetical mean deviation of surface Sa of from 15 nm to less than 150 nm and a kurtosis of surface height distribution Sku of from 1.5 to 5. The polyester of the polyester base film in the invention may be polyethylene terephthalate, polyethylene naphthalate, polypropylene terephthalate, polybutylene terephthalate, polypropylene naphthalate, or a combination of two or more of the above. The polyester may also be a copolymer of any of these monomers and any other dicarboxylic acid or diol component. In this case, the polyester film is preferably a crystal-oriented film with a crystallinity of 25% or more, more preferably 30% or more, even more preferably 35% or more. If the crystallinity is less than 25%, dimensional stability or mechanical strength may tend to be insufficient. The crystallinity may be determined by a density gradient method (JIS K 7112 (1980)) or Raman spectroscopic analysis.

When the polyester described above is used, its intrinsic viscosity (the value measured in o-chlorophenol at 25° C. according to JIS K 7367) is preferably from 0.4 to 1.2 dl/g, more preferably from 0.5 to 0.8 dl/g.

The polyester film used in the invention may be a composite film having a laminated structure of two or more layers. For example, such a composite film may be a composite film including an inner layer part substantially free of particles and a surface layer part containing particles. The inner layer part and the surface layer part may be made of chemically different polymers or the same polymer. When the film of the invention is for use in display antireflection films, the feature that the polyester film is free of particles and so on is preferred in view of optical properties, because an internal scattering-induced increase in haze or the like can be prevented.

In the invention, the polyester film with the hard cost layer provided thereon is preferably crystal-oriented by biaxial stretching so that the thermal stability of the film, specifically the dimensional stability or the mechanical strength, can be sufficient and a high level of flatness can be provided. The film crystal-oriented by biaxial stretching is intended to include a film that shows a biaxial orientation pattern in a wide angle X-ray diffraction analysis and is produced by a process including the steps of stretching a non-crystal-oriented thermoplastic resin film 2.5 to 5 times in the longitudinal direction and/or the transverse direction and then heat-treating the film to complete crystal orientation.

The thickness of the polyester film used in the invention may be from 10 to 500 µm, preferably from 20 to 300 µm in view of mechanical strength, handling or the like, while it may be appropriately selected depending on the use of the hard-coated film of the invention. When used for display antireflection films, the polyester film particularly preferably has a thickness of 75 to 200 µm.

The polyester film of the invention may contain various additives, resin compositions, crosslinking agents or the like, as long as the effects of the invention are not inhibited. Examples of such materials include antioxidants, heat-resisting stabilizers, ultraviolet ray-absorbing agents, organic or inorganic particles (such as silica, colloidal silica, alumina, alumina sol, kaolin, talc, mica, calcium carbonate, barium sulfate, carbon black, zeolite, titanium oxide, and metal fine particles), pigments, dyes, antistatic agents, nucleus formation agents, acrylic resins, polyester resins, urethane resins, polyolefin resins, polycarbonate resins, alkyd resins, epoxy resins, urea resins, phenol resins, silicone resins, rubber resins, wax compositions, melamine crosslinking agents, oxazoline crosslinking agents, methylolated or alkylolated urea crosslinking agents, acrylamide, polyamide, epoxy resins, isocyanate compounds, aziridine compounds, various silane coupling agents, and various titanate coupling agents.

Particularly when used for plasma display antireflection films, the polyester film preferably has an ultraviolet light interception function and preferably contains an ultraviolet ray-absorbing agent so that a dye having a color correction or near-infrared light interception function may be used.

Preferred examples of the ultraviolet ray-absorbing agent include salicylic acid-based compounds, benzophenone-based compounds, benzotriazole-based compounds, cyanoacrylate-based compounds, benzoxazinone-based compounds, and cyclic iminoester compounds. Benzoxazinone-based compounds are most preferred in view of color tone and ultraviolet light interception at 380 nm to 390 nm. One or more of these compounds may be used alone or in any combination. These compounds are more preferably used in combination with a stabilizer such as a hindered amine light stabilizer (HALS) and an antioxidant.

Examples of benzoxazinone-based compounds (preferred materials) include 2-p-nitrophenyl-3,1-benzoxazine-4-one, 2-(p-benzoylphenyl)-3,1-benzoxazine-4-one, 2-(2-naphthyl)-3,1-benzoxazine-4-one, 2-2'-p-phenylenebis(3,1-benzoxazine-4-one), and 2,2'-(2,6-naphthylene)bis(3,1-benzoxazine-4-one). The polyester base film may contain 0.5 to 5% by weight, preferably 1 to 5% by weight, of any of these compounds.

In order to impart further improved light resistance, a cyanoacrylate-based tetramer compound is preferably used in combination therewith. The base film preferably contains 0.05 to 2% by weight of a cyanoacrylate-based tetramer compound. The cyanoacrylate-based tetramer compound is a compound based on a tetramer of cyanoacrylate, examples of which include 1,3-bis(2'cyano-3,3-diphenylacryloyloxy)-2,2-bis-(2'cyano-3,3-diphenylacryloyloxymethylpropane) and the like. When used in combination with this compound, the ultraviolet ray-absorbing agent is preferably added in an amount of 0.3 to 3% by weight to the base film.

When the ultraviolet ray-absorbing agent is added, the hard-coated film of the invention and the antireflection film with the hard-coated film each preferably has a transmittance of 5% or less, more preferably 3% or less, at a wavelength of 380 nm, so that the base film, the dye, or pigment can be protected from ultraviolet rays particularly when the film is used as a plasma display component. The transmittance may be determined at a wavelength of 380 nm with a spectrophotometer U-3410 (manufactured by Hitachi, Ltd.) equipped with an integrating sphere 130-063 with a diameter of 60 mm (manufactured by Hitachi, Ltd.) and a 10°-inclined spacer.

The hard-coated film of the invention preferably has a total light transmittance of 90% or more, more preferably 92% or more, even more preferably 94% or more. If the total light transmittance is less than 90%, the hard-coated film may inhibit the sharpness of images when it forms an antireflection film.

The hard-coated film of the invention includes a polyester film and a hard coat layer placed on at least one side of the polyester film and having a surface with irregularities, wherein the hard coat surface has 3D surface roughness parameters including an arithmetical mean deviation of surface Sa of from 15 nm to less than 150 nm and a kurtosis of surface height distribution Sku of from 1.5 to 5.

The 3D surface roughness of the hard coat surface may be determined from the 3D surface profile of the hard coat surface obtained by measuring the hard coat surface with a surface profiler SP-500 or SP-700 (manufactured by Toray Engineering Co., Ltd., a system capable of non-destructively measuring interface shape and surface profile at the same time) and a ×5 objective lens in WSI mode. The arithmetical mean deviation of surface Sa and the kurtosis of surface height distribution Sku, which are 3D surface roughness parameters of the hard coat surface defined according to the invention, may be obtained by analyzing the 3D surface profile (measured with SP-500 or SP-700) with a nanoscale 3D image processing software SPIP™ (manufactured by Image Metrology A/S).

More specifically, the arithmetical mean deviation of surface Sa is obtained by extending two-dimensional Ra to three-dimensional level and may be calculated by dividing, by the measured area, the volume surrounded by a curve of surface shape and a mean surface, according to the formula below. When the XY plane and the Z axis represent the horizontal plane and the vertical direction, respectively, and when the height at the k-th x and l-th y in the measured curve of surface shape is expressed as z(xk,yl), the following formula is derived.

$$S_a = \frac{1}{MN}\sum_{k=0}^{M-1}\sum_{l=0}^{N-1} |z(x_k, y_l) - \mu| \quad \text{[su1]}$$

The term µ is a mean surface calculated from the following formula.

$$\mu = \frac{1}{MN}\sum_{k=0}^{M-1}\sum_{l=0}^{N-1} z(x_k, y_l) \quad \text{[su2]}$$

The kurtosis of surface height distribution Sku is a measure of the sharpness of the curve of surface shape for characterizing the spread of the surface height distribution and is defined by the following formula.

$$S_{ku} = \frac{1}{MNS_q^4} \sum_{k=0}^{M-1} \sum_{l=0}^{N-1} [z(x_k, y_l) - \mu]^4 \qquad \text{[su3]}$$

Sq is a three-dimensional extension of two-dimensional Rq (RMS) and corresponds to a standard deviation σ in statistics. Sq is a root-mean-square deviation obtained by dividing, by the measured area, the volume of the portion between the mean surface and the curved surface calculated by squaring the distance between the curve of surface shape and the mean surface and then calculating the square root of the quotient.

$$S_q = \sqrt{\frac{1}{MN} \sum_{k=0}^{M-1} \sum_{l=0}^{N-1} [z(x_k, y_l) - \mu]^2} \qquad \text{[su4]}$$

When Sku=3, a normal distribution is provided, and as this value decreases, the surface height distribution becomes a smooth shape, while an increase in this value means that the projection becomes sharp.

Concerning the 3D surface roughness parameters of the surface of the hard coat layer according to the invention, the arithmetical mean deviation of the surface Sa is 15 nm or more and less than 150 nm, preferably from 20 nm to 100 nm, more preferably from 30 nm to 85 nm, and the kurtosis of surface height distribution Sku is from 1.5 to 5, preferably from 1.5 to 3, more preferably from 1.5 to 2.5. If Sa is less than 15 nm, the hard coat layer surface is so smooth that after the antireflection treatment, light reflected from the surface can suffer from color heterogeneity, or reflection of external light such as fluorescent lamp light can increase, which may lead to a defective appearance or a reduction in clear view properties. If Sa is 150 nm or more, reflected light can be scattered by the hard coat surface so that reflection of external light such as fluorescent lamp light can be effectively reduced, but sharpness can be reduced due to clouding or significant scattering of transmitted images, and screen glittering can be significant.

Theoretically, Sku does not become less than 1. If Sku is more than 5, the surface would have sharp projections in a scattered manner so that visible color heterogeneity or screen glittering can be caused by reflected light after the antireflection treatment, which may lead to a defective appearance. If Sku is less than 1.5, the projection shape would be smooth so that reflection of external light or fluorescent lamp light may tend to be increase.

The hard coat surface profile (Sa and Sku) according to the invention is most preferably achieved using a method of providing the hard coat layer during the process of preparing the polyester film, because of cleanliness and cost effectiveness and because the hard coat layer surface and the interface between the polyester film and the hard coat layer can be shaped at the same time by such a method. According to such a method, the surface irregularities of the hard coat layer can be controlled in such a manner that irregularities of the interface between the polyester film and the hard coat layer are formed and reflected. Specifically, the surface profile may be controlled by optimizing the coating liquid viscosity, the stretching process in the transverse direction after the hard coat layer coating, the thermal history of the hard coat layer-hardening process, or the relaxation process after the hard coat layer-hardening process.

When the interface between the hard coat layer and the polyester film has irregularities, an interference iris pattern can be reduced, which would otherwise be caused by interference of reflected light from the hard coat layer surface and the hard coat layer/base interface in conventional technologies. Specifically, the projections present in the interface allows the segmentation of the interface area from which light beams are reflected with the same optical path difference, so that an interference iris pattern is divided into segments at an invisible domain level, which reduces the interference iris pattern. When this structure is formed, screen glittering can also be reduced.

The projections (bumps) of the irregularities of the interface between the hard coat layer and the polyester film preferably has a height of from 0.3 μm to 2 μm, more preferably from 0.3 μm to 1 μm, even more preferably from 0.4 μm to 0.7 μm.

A projection height of more than 2 μm is not preferred, because such a height can make the hard coat layer surface too rough or can cause the transmitted image to glitter. As used herein, the term "projection height" refers to the maximum height Rz of an interface shape curve (JIS B 0601:'01).

According to the invention, the hard coat layer surface has specific Sa and Sku values as described above. Such irregularities of the hard coat layer surface is effective not only in reducing the interference iris pattern but also in reducing coloration of reflected light from the antireflection layer further placed on the hard coat layer surface, reducing coloration irregularity, and reducing reflection of external light without screen glittering. The projections present in the hard coat surface are effective in producing fine unevenness in the thickness of the antireflection layer so that the intensity of reflected light in the visible light range can be flattened and the wavelength dependence can be reduced.

In an embodiment of the invention, if necessary, a polyester-based adhesive layer, an acrylic adhesive layer, a polyurethane-based adhesive layer, or the like may be interposed between the polyester film and the hard coat layer. In a preferred aspect of the invention, however, the polyester base film and the hard coat layer are strongly bonded to each other with no adhesive layer interposed therebetween so that the adhesion can be maintained under moisture or heat and that interference iris patterns can be reduced.

In the invention, the interface between the hard coat layer and the polyester film may have irregularities on the polyester film surface, and the hard coat surface profile may have depressions immediately above projections of the irregularities in the cross-sectional direction. Alternatively, projections of the interface may coincide with projections of the hard coat layer surface in a pattern contrary to the above. As used herein, the term "cross-sectional direction" refers to a direction perpendicular to the film surface.

Specifically, FIG. 1 shows a state where in the cross-sectional direction, depressions of the curve of surface roughness of the hard-coated film coincide with projections of the curve of roughness of the interface between the polyester film and the hard coat layer, and FIG. 2 shows a pattern contrary thereto.

The state where depressions of the curve of surface roughness of the hard-coated film coincide with projections of the curve of roughness of the interface between the polyester film and the hard coat layer cannot be achieved by conventional techniques such as conventional addition of particles, conventional shape-transfer methods, and conventional coating methods. It has been found that the state can be achieved by the method of applying a coating liquid to form the hard coat layer during the film forming process according to the invention as described herein and that the reverse pattern can also be formed by a direct extension of such a technique.

Examples of methods for checking such a structure include a method including the steps of cutting a cross-section from the film and observing the cross-section with a microscope to obtain profile lines from the hard coat layer surface and from the interface between the polyester film and the hard coat layer, and a method including the step of measuring the curves of surface roughness and the interface roughness at the same time with a surface profiler SP-500 or SP-700 (manufactured by Toray Engineering Co., Ltd.). In view of measurement accuracy, the structure is most preferably checked by the method using a surface profiler SP-500 or SP-700 (manufactured by Toray Engineering Co., Ltd., a system capable of non-destructively measuring interface shape and surface profile at the same time).

The interface between the hard coat layer and the polyester film according to the invention, which has irregularities, may be formed by the method described below that includes applying a hard coat layer-forming coating liquid to a thermoplastic film under conditions such that the surface of the film can be cracked during stretching of the film before stretch orientation completion and forming projections on the interface in the stretching process.

Additionally, in order to achieve the hard coat surface profile (Sa and Sku), a feature according to the invention, the transverse stretching temperature may be lowered so that the leveling capability of the non-hardened coating film surface can be controlled after the application of the hard coat layer-forming coating liquid and until the coating is hardened and so that the leveling capability can be reduced, and a heating leveling zone may be provided to increase the leveling capability, so that the surface irregularities can be controlled.

In general, the thickness of the hard coat layer is preferably from 0.5 µm to 30 µm, more preferably from 1 µm to 15 µm, while it may be determined depending on use. If the hard coat layer has a thickness of less than 0.5 µm, it may be so thin that it may tend to have an insufficient surface hardness and to be damaged, even when it is sufficiently hardened. If it has a thickness of more than 30 µm, it may tend to curl during hardening, or the hardened film may tend to be cracked by stress such as bending stress.

The hard-coated film having the structure described above may be produced by the method described below.

The hard coat layer-forming composition to be placed on at least one side of the polyester film typically includes an acrylic compound, a urethane compound, a urethane acrylate compound, a melamine compound, an organic silicate compound, a silicone compound, a metal oxide, or the like. In particular, a heat- or active ray-hardenable acrylic compound is preferred, and a hardenable composition including a multifunctional acrylate compound as a main component is preferred. The main component preferably makes up at least 50% by weight, more preferably at least 70% by weight, of the hard coat layer. The term "multi-functional acrylate" refers to a monomer, oligomer, or prepolymer having at least three (more preferably at least four, even more preferably at least five) (meth)acryloyloxy groups per molecule (it should be noted that as used herein, the term "...(meth)acry..." is an abbreviation for "...acry...or...methacry..."). Such a composition may include a compound produced by esterification of the hydroxyl groups of a polyhydric alcohol having three or more alcoholic hydroxyl groups per molecule with three or more molecules of (meth)acrylic acid.

Examples of such a compound that may be used include pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, trimethylolpropane tri(meth)acrylate, pentaerythritol triacrylate hexamethylene diisocyanate urethane prepolymer, pentaerythritol triacrylate toluene diisocyanate urethane prepolymer, and pentaerythritol triacrylate isophorone diisocyanate urethane prepolymer. One or more of them may be used alone or in any combination.

The monomer, oligomer, or prepolymer having at least three (meth)acryloyloxy groups per molecule is preferably used in an amount of 50 to 90% by weight, more preferably 50 to 80% by weight, based on the total amount of the hard coat layer-forming components.

The compound described above is preferably used in combination with any other monofunctional or bifunctional acrylate for the purpose of relaxing the rigidity of the hard coat layer, reducing the contraction during hardening, or adjusting the viscosity of the coating liquid. Any radically-polymerizable monomer having one or two ethylenic unsaturated double bonds per molecule may be used without particular restrictions.

Examples of compounds having two ethylenic unsaturated double bonds per molecule that may be used include the following compounds:

(a) (meth)acrylate diesters of $C_2$ to $C_{12}$ alkylene glycol such as ethylene glycol di(meth)acrylate, propylene glycol di(meth)acrylate, 1,4-butanediol di(meth)acrylate, neopentylglycol di(meth)acrylate, and 1,6-hexanediol di(meth)acrylate;

(b) (meth)acrylate diesters of polyoxyalkylene glycol such as diethylene glycol di(meth)acrylate, triethylene glycol di(meth)acrylate, tetraethylene glycol di(meth)acrylate, dipropylene glycol di(meth)acrylate, polyethylene glycol di(meth)acrylate, and polypropylene glycol di(meth)acrylate;

(c) (meth)acrylate diesters of polyhydric alcohol such as pentaerythritol di(meth)acrylate;

(d) (meth)acrylate diesters of ethylene oxide adducts and propylene oxide adducts of bisphenol A or hydrogenated bisphenol A, such as 2,2'-bis(4-acryloxy-ethoxy-phenyl)propane and 2,2'-bis(4-acryloxy-propoxy-phenyl)propane;

(e) urethane (meth)acrylates having at least two (meth)acryloyloxy groups per molecule, which are produced by the reaction of a terminal isocyanate group-containing compound with an alcoholic hydroxyl group-containing (meth)acrylate, wherein the terminal isocyanate group-containing compound is produced by the pre-reaction of a diisocyanate compound with a compound containing at least two alcoholic hydroxyl groups; and (f) epoxy (meth)acrylates having at least two (meth)acryloyloxy groups per molecule, which are produced by the reaction of a compound having at least two epoxy groups per molecule with acrylic or methacrylic acid.

Examples of compounds having one ethylenic unsaturated double bond per molecule that may be used include methyl (meth)acrylate, ethyl (meth)acrylate, n-propyl or isopropyl (meth)acrylate, n-, sec-, or tert-butyl (meth)acrylate, 2-ethylhexyl (meth)acrylate, lauryl (meth)acrylate, stearyl (meth)acrylate, methoxyethyl (meth)acrylate, ethoxyethyl (meth)acrylate, hydroxyethyl (meth)acrylate, polyethylene glycol mono(meth)acrylate, polypropylene glycol mono(meth)acrylate, glycidyl (meth)acrylate, tetrahydrofurfuryl (meth)acrylate, N-hydroxyethyl(meth)acrylamide, N-vinylpyrrolidone, N-vinyl-3-methylpyrrolidone, and N-vinyl-5-methylpyrrolidone. One or more of these monomers may be used alone or in any combination.

The monomer or monomers having one or two ethylenic unsaturated double bonds per molecule are preferably used in an amount of 10 to 40% by weight, more preferably 20 to 40% by weight, based on the total amount of the hard coat layer-forming components. The acrylic oligomer is a compound having an acrylic resin skeleton and a reactive acrylic group bonded thereto, such as polyester acrylate, urethane acrylate, epoxy acrylate, and polyether acrylate, and a compound having a rigid skeleton such as melamine or isocyanuric acid and an acrylic group bonded to the skeleton may also be used.

The coating composition composed of these materials preferably has a viscosity of 1000 to 5000 mPa·s (25° C.) or a viscosity of 50 to 200 mPa·s during heating (100° C.). Particularly when the viscosity is from 50 to 200 mPa·s during heating (100° C.), the hard coat layer surface profile can be easily controlled.

If the coating liquid has a viscosity of less than 50 mPa·s during heating (100° C.), its fluidity is so high that the surface cannot be formed in such a manner that the irregularities of the interface between the hard coat layer and the base film, so that it may be smoothed. If the coating liquid has a viscosity of more than 200 mPa·s during heating (100° C.), its fluidity is so low that a long leveling time may be required to produce the desired surface profile so that the productivity may be reduced. In the invention, the viscosity of the coating liquid may be measured with an E-type viscometer, and when the coating composition contains a volatile substance at 100° C. or lower, the viscosity is a value obtained by measuring the viscosity of a residue resulting from heating the coating composition in an open system at 100° C. for 10 minutes.

In the invention, if necessary, a reactive diluent may also be used. The reactive diluent is a material that serves as a coating composition medium to reduce the viscosity in the coating process and has a group reactive with a monofunctional or multifunctional acrylic oligomer to serve as a co-reactive component for the coating film by itself.

Examples of the acrylic oligomer, the reactive diluent, and the like may be found in Shinzo Yamashita and Tosuke Kaneko (ed.), "Crosslinking Agent Handbook," published by Taiseisha, Ltd. (1981), pages 267 to 275 and pages 562 to 593. Examples of commercially-available curable multifunctional acrylic coating compositions that may be used include Diabeam (registered trademark) series manufactured by Mitsubishi Rayon Co., Ltd., Dinacol (registered trademark) series manufactured by NAGASE & COMPANY, Ltd., NK Ester (trade name) series manufactured by Shin-Nakamura Chemical Co., Ltd., UNIDIC (trade name) series manufactured by Dainippon Ink & Chemicals, ARONIX (registered trademark) series manufactured by Toagosei Co., Ltd., BLENMER (registered trademark) series manufactured by NOF CORPORATION, KAYARAD (trade name) series manufactured by NIPPON KAYAKU Co., Ltd., and LIGHT ESTER (registered trademark) and LIGHT ACRYLATE (registered trademark) series manufactured by Kyoeisha Chemical Co., Ltd.

In the invention, an application conditioner, an antifoaming agent, a thickener, an antistatic agent, inorganic particles, organic particles, an organic lubricant, an organic polymer compound, an ultraviolet ray-absorbing agent, a light stabilizer, a dye, a pigment, a stabilizer, or the like may be used as a modifier for the hard coat layer. Any of these materials may be used as a component of a coating layer composition to form the hard coat layer and can modify the properties of the hard coat layer depending on use, as long as the reaction by heating or active rays is not reduced.

In the invention, for example, the hard coating composition may be hardened by a method of applying ultraviolet rays as active rays, a high-temperature heating method, or the like. When these methods are used, a photopolymerization initiator, a thermal polymerization initiator, or the like is preferably added to the hard coating composition.

Examples of photopolymerization initiators that may be used include carbonyl compounds such as acetophenone, 2,2-diethoxyacetophenone, p-dimethylacetophenone, p-dimethylaminopropyophenone, benzophenone, 2-chlorobenzophenone, 4,4'-dichlorobenzophenone, 4,4'-bisdiethylaminobenzophenone, Michler's ketone, benzyl, benzoin, benzoin methyl ether, benzoin ethyl ether, benzoin isopropyl ether, methyl benzoyl formate, p-isopropyl-α-hydroxyisobutylphenone, α-hydroxyisobutylphenone, 2,2-dimethoxy-2-phenylacetophenone, 1-hydroxycyclohexyl phenyl ketone; and sulfur compounds such as tetramethylthiuram monosulfide, tetramethylthiuram disulfide, thioxanthone, 2-chlorothioxanthone, and 2-methylthioxanthone. One or more of these photopolymerization initiators may be used alone or in any combination. A peroxide compound such as benzoyl peroxide, di-tert-butyl peroxide, or the like may be used as the thermal polymerization initiator.

The photopolymerization initiator or the thermal polymerization initiator is appropriately used in an amount of 0.01 to 10 parts by weight, based on 100 parts by weight of the hard coat layer-forming composition. When electron beams or gamma rays are used for hardening, addition of the polymerization initiator is not necessarily required. Also when thermal hardening at a high temperature of 200° C. or higher is performed, addition of the thermal polymerization initiator is not necessarily required.

In order to prevent unnecessary thermal polymerization during manufacturing or to prevent a dark reaction during storing, a thermal polymerization preventing agent such as hydroquinone, hydroquinone monomethyl ether, or 2,5-tert-butylhydroquinone is preferably added to the hard coat layer-forming composition used in the invention. The thermal polymerization preventing agent is preferably added in an amount of 0.005 to 0.05% by weight, based on the total weight of the hard coat layer-forming composition.

In the invention, an isocyanate compound or a melamine-based crosslinking agent is preferably added to the coating composition to form the hard coat layer so that the hard coat layer can be directly bonded to the polyester film. Known isocyanate compounds may be used, examples of which include monomers, dimers, or oligomers of 2,4- and/or 2,6-tolylenediisocyanate, 4,4'-diphenylmethane diisocyanate (abbreviated as MDI), polymeric MDI, 1,5-naphthylenediisocyanate, tolidinediisocyanate, 1,6-hexamethylenediisocyanate (abbreviated as HDI), trimethyl hexamethylene diisocyanate, isophorone diisocyanate, xylylene diisocyanate (abbreviated as XDI), hydrogenated XDI, hydrogenated MDI, lysinediisocyanate, triphenylmethane triisocyanate, and tris(isocyanatophenyl)thiophosphate. One or more of them may be used alone or in any combination. While the melamine-based crosslinking agent may be of any type, melamine, methylolated melamine derivatives produced by condensation of melamine and formaldehyde, partially or completely etherified compounds produced by the reaction of methylolated melamine with lower alcohol, or any mixture thereof may be used. The melamine-based crosslinking agent to be used may be a monomer, a dimer, a condensation oligomer, or any mixture thereof.

The lower alcohol to be used for the etherification may be methyl alcohol, ethyl alcohol, isopropyl alcohol, n-propyl alcohol, n-butanol, isobutanol, or the like. The melamine-based crosslinking agent may have an imino group, a methylol group, or an alkoxymethyl group such as methoxymethyl or butoxymethyl as a functional group in the molecule and may be an imino group-type methylated melamine, a methylol group-type melamine, a methylol group-type methylated melamine, a complete alkylation-type methylated melamine, or the like. In particular, methylolated melamine and complete alkylation melamine are preferred in view of adhesion. The content of the isocyanate compound or the melamine-based crosslinking agent in the solids of the hard coat-forming coating composition is preferably, but not limited to, from 2 to 40% by weight, more preferably from 5 to 30% by weight, in view of a balance between adhesion and hardness.

In order to enhance the hardening of melamine, an acid catalyst is preferably used in combination with the melamine-based crosslinking agent. The acid catalyst that may be used is preferably p-toluenesulfonic acid, dodecylbenzenesulfonic acid, dimethylpyrophosphoric acid, styrenesulfonic acid, or any derivative thereof (such as a block agent (dimethylethanolamine or the like) adduct). The acid catalyst is preferably added in an amount of 0.05 to 10% by weight, more preferably 1 to 5% by weight (on a solid basis), based on the amount of the melamine crosslinking agent. When the melamine-based crosslinking agent is added, it is particularly preferred that the coating composition should include a multifunctional acrylate having at least one hydroxyl group, in terms of improving the adhesion.

In the process of forming the hard coat layer according to the invention, a leveling agent is preferably used to moderately smooth the hard coat layer surface. Typical leveling agents include silicone leveling agents, acrylic leveling agents, fluoride leveling agents, and so on. When only smoothness is required, addition of a small amount of a silicone leveling agent is effective. Such a silicone leveling agent preferably has a polydimethylsiloxane main skeleton to which polyoxyalkylene groups are added (for example, SH 190 manufactured by Toray Dow Corning Silicone Corporation).

When a laminated film is further provided on the hard coat layer, the coatability and adhesion of the laminated film are required not to be inhibited. In such a case, acrylic leveling agents are preferably used. Such acrylic leveling agents preferably used include ARUFON-UP1000 series, UH2000 series, and UC3000 series (trade names) manufactured by Toagosei Co., Ltd. The content of the leveling agent added to the hard coat layer-forming composition is preferably from 0.01 to 5% by weight.

The most preferred mode of the formation of projections on the interface between the polyester film and the hard coat layer and on the hard coat layer surface is specifically described below.

An ultraviolet ray-absorbing agent-containing polyester material substantially free of projection-forming particles is subjected to melt extrusion and cast on a mirror surface drum with a static electricity-applying system so that it is formed into a sheet. The sheet is stretched 3 to 4.5 times in the longitudinal direction. In this process, heating stretching is performed with a radiation heater so that the refractive index in the longitudinal direction can be from 1.62 to 1.68 according to abbe method and that the crystallinity of the hard coating composition-receiving side can be from about 11 to about 25% according to Raman method.

A hard coating composition prepared with a multifunctional acrylate, a bifunctional or trifunctional acrylate, a melamine-based crosslinking agent and a hardening catalyst therefor, a leveling agent, and so on is applied in a thickness of about 10 to about 20 μm to the hard coating composition-receiving surface of the film. The coated film is continuously introduced into a tenter and stretched in the transverse direction, while its end is held with a clip. In this tenter, the film is preheated to 60 to 80° C. and then slightly stretched 1.1 to 1.8 times in the transverse direction at 70 to 85° C. The slight stretching forms fine cracks on the surface of the film that is crystal-oriented in the longitudinal direction. A part of the hard coating composition infiltrates into the cracks. The hard coat layer surface forms depressions at sites where the coating composition infiltrates. The infiltration parts improve the crystallinity of the PET around them. After the slight stretching, the coated film is further stretched 2.5 to 3.5 times in the transverse direction at 85 to 100° C., so that the hard coating composition-infiltrating parts with improved crystallinity form gently raised projections. The hard coat layer surface forms gentle depressions immediately above the projections of the interface. Therefore, the depressions of the hard coat surface are formed in response to and immediately above the interface projections. The film is then continuously introduced into a heat treatment zone at 200 to 235° C. so that the hard coat layer is cured by heating, while the film is relaxed by 3 to 7% in the transverse direction. After the heat hardening, the film is further heat-treated under tension at 220 to 240° C. so that the orientation and crystallization of the polyester base film is completed. The hard-coated film obtained by this method has a hard coat surface Sa of about 15 to about 70 nm and has a pattern in which each projection of the interface and each depression of the hard coat surface coincide with each other in the thickness direction.

In order to further increase Sa, the film after the heat hardening may be relaxed by 1.5 to 15% in total in the longitudinal direction and/or the transverse direction at 200 to 235° C. so that it can have Sa of about 50 to about 200 nm. The control of the relaxation rate allows Sa to fall within the range according to the invention. When the method of increasing Sa by relaxation is used after the hardening of the hard coat layer, projections of the interface between the polyester base film and the hard coat layer and projections of the hard coat layer surface can be configured to coincide with each other in the thickness direction.

The relaxation after the hardening of the hard coat layer allows the polyester base film to shrink so that the projections are further raised, and, consequently, depressions of the hard coat layer immediately above the projections are raised and converted into projections. Therefore, when the method of increasing Sa is used, the relationship between the interface structure and the surface structure can be reversed with Sa and Sku falling within the range.

In the resulting surface profile, irregularities of the base film and the hard coat layer are formed substantially without the aid of particles. Therefore, the surface profile can be free from particle-induced light scattering or substantially free from screen glittering. When depressions of the hard coat layer are formed immediately above projections of the interface, respectively, external light reflection can be effectively and significantly reduced, particularly in the normal direction, with no loss of image sharpness and with no screen glittering. On the other hand, when projections of the hard coat layer surface are formed immediately above projections of the interface, respectively, the increase in Sa is synergistically effective, so that reflection of strong external light such as fluorescent light can be effectively and highly reduced and that sufficient relaxation can reduce the heat shrinkage ratio at 150° C. for 30 minutes to 0.8% or less, which is particularly preferred, because the dimensional stability is improved against heating in the subsequent antireflection process or the like.

The hard-coated film obtained by the most preferred method described above has irregularities on the interface and on the hard coat surface. Concerning Sa defined above, Sa (Sa1) of the hard coat layer surface is from 15 nm and less than 150 nm, and the ratio of Sa (Sa2) of the interface to Sa1 (Sa2/Sa1) should be from 2 to 20, preferably from 5 to 15, in view of a balance between image sharpness and screen glittering.

In view of a balance between antireflection and screen glittering, the arithmetical mean slope angle (Δa) of the hard coat layer surface defined below should be from 0.2 to 1.0 degree, preferably from 0.3 to 0.7 degrees. In the invention, the arithmetical mean slope angle (Δa) of the hard coat layer surface may be determined from the 3D surface profile of the hard coat surface obtained by measuring the hard coat surface with a surface profiler SP-500 or SP-700 (manufactured by Toray Engineering Co., Ltd., a system capable of non-destructively measuring interface and surface profiles at the same time) and a ×5 objective lens in WSI mode. Curved surfaces are measured in two directions perpendicular to each other by 3D surface profile measurement, respectively. A measured curve obtained from each measured curved surface is segmented at regular intervals in the lateral direction (x-axis direction). The absolute value of the slope (angle) of the line between the starting and ending points of the measured curve in each segment is obtained. The average (Δa1, Δa2) of the values obtained over the measured curves is further averaged (Δa=(Δa1+Δa2)/2). FIG. 3 schematically shows the process for determining Δa. In general, Δa may be calculated from the formula below. When the XY plane and the Z axis represent the horizontal plane and the vertical direction, respectively, and when the height at the k-th x and l-th y in the measured surface shape curve is expressed as z(xk,yl), the following formula is derived.

$$\Delta a = \frac{1}{MN} \sum_{k=0}^{M-1} \sum_{l=0}^{N-1} \left\{ \tan^{-1} \left| \frac{z(x_{k+1}, y_l) - z(x_k, y_l)}{x_{k+1} - x_k} \right| \right\}$$ [su5]

If the arithmetical mean slope angle (Δa) of the surface is less than 0.2 degrees, images reflected from the surface can be clearly visible and undesirably reduce the clear view properties. If the arithmetical mean slope angle (Δa) of the surface is more than 1.0 degrees, the transmitted image can cause glittering, or white blur of the image can occur, which is not preferred.

The arithmetical mean slope angle of the surface is an index of the degree of diffused reflection on the surface. When the arithmetical mean slope angle Δa is 0 degrees, the surface can produce mirror reflection, and the reflected image is clearly visible. As the arithmetical mean slope angle Δa increases, diffused reflection increases, so that the reflected image becomes blurred. As the arithmetical mean slope angle Δa further increases, multiple reflections can occur so that white blur of the image can be caused by light scattering. The arithmetical mean slope angle Δa is set within the desired range so that the reflected image can be slightly shifted and superimposed on the specularly reflected image to form a blurred image.

The haze value of the hard-coated film of the invention should be less than 3%, preferably 2% or less, more preferably 1% or less, according to JIS K 7136. If the haze value is 3% or more, the clear view properties or the sharpness of the transmitted image may be reduced.

The haze may be controlled by the stretching temperature during the film production. The haze may be reduced by lowering the stretching temperature, while it may be increased by raising the stretching temperature, so that the haze may be set in the range by controlling the stretching temperature.

The hard-coated film of the invention is highly productive, because the hard coat layer can be formed at once in the film forming process. The hard-coated film of the invention produced as described above has high surface hardness, high abrasion resistance, and high adhesion between the hard coat layer and the base film with no adhesion-facilitating layer interposed therebetween. The hard-coated film of the invention produced as described above is also reduced in interference iris pattern and has a high level of clear view properties. Therefore, the hard-coated film of the invention finds a wide range of uses and is particularly suitable for use as a display antireflection film substrate, a touch panel substrate, or the like.

The hard coat layer-forming coating composition may be applied using various coating methods such as reverse coating, gravure coating, rod coating, bar coating, die coating, and spray coating.

The heat required for thermal hardening of the hard coat layer may be provided by heating air or an inert gas to a temperature of 140° C. or higher with a steam heater, an electric heater, an infrared heater, or a far infrared heater and blowing the heated air or inert gas to the base film or the coating film through a slit nozzle. In particular, the heat is preferably provided by air heated at 200° C. or higher, more preferably by nitrogen heated at 200° C. or higher, so that high hardening rate can be achieved.

The hard-coated film of the invention may be bonded to various functional films by various methods before use. A pressure-sensitive adhesive layer or an electrically-conductive layer may also be placed on the other side of the hard-coated film.

For example, the other side of the hard-coated film of the invention opposite to the hard coat layer may be bonded to a counterpart member with various pressure-sensitive adhesives so that the function of the hard coat layer such as abrasion resistance or scratch resistance may be imparted to the counterpart member before use. In this case, the pressure-sensitive adhesive to be used may be a rubber-based, acrylic, silicone-based, or polyvinyl ether-based pressure-sensitive adhesive (adhesive).

Pressure-sensitive adhesives-fall into two broad categories: solvent type pressure-sensitive adhesives and solvent-free type pressure-sensitive adhesives. Solvent type pressure-sensitive adhesives are excellent in drying characteristics, productivity and processability and therefore dominant even now. In recent years, however, they have been being replaced by solvent-free type pressure-sensitive adhesives in view of environmental pollution, energy saving, resource conservation, safety, or the like. It is particularly preferred to use an active ray-hardenable pressure-sensitive adhesive that can be hardened in seconds by active ray irradiation and provide advantageous properties such as flexibility, adhesion, and chemical resistance.

Examples of active ray-curable acrylic pressure-sensitive adhesives include, but are not limited to, those found in "Adhesive Data Book," edited by The Adhesion Society of Japan and published by The Nikkan Kogyo Shimbun, Ltd., 1990, pages 83 to 88. Commercially available examples of multifunctional ultraviolet-curable acrylic coating compositions include, but are not limited to, XY (trade name) series manufactured by Hitachi Kasei Polymer Co., Ltd., Hirock (trade name) series manufactured by Toho Chemical Industry Co., Ltd., Three Bond (registered trademark) series manufactured by ThreeBond Co., Ltd., Arontite (registered trademark) series manufactured by Toagosei Co., Ltd., and Cemerock Super (registered trademark) serried manufactured by Cemedine Co., Ltd.

When this type of adhesive is applied to a general biaxially-oriented polyester film, insufficient adhesion is provided. Various types of primer treatment such as the deposition of an acrylic resin film, a polyester resin film, a urethane resin film, or the like can improve the adhesion between the polyester film and the pressure-sensitive adhesive layer.

In the invention, the hard coat layer may be formed on one side, and a primer layer may be formed on the other side to improve the adhesion to the pressure-sensitive adhesive layer. It will be understood that the process of forming the primer layer may include coating of the back surface when a coating liquid containing a thermally-hardenable composition for forming the hard coat layer is applied to the front surface; drying the coating; and optionally stretching.

The hard-coated film of the invention may be used for an antireflection film of a plasma display or the like. In this case, it is preferably used after a method for reducing the reflectance of the surface that includes providing a low-refractive-index layer with a refractive index of 1.45 or less on the hard coat layer or providing a high-refractive-index layer with a refractive index of 1.55 or more on the hard coat layer and then providing a low-refractive-index layer with a refractive index of 1.45 or less thereon, while it may be used as it is.

The high-refractive-index layer is preferably, but not limited to, a layer with a refractive index of about 1.55 to about 1.70 and a thickness of 0.03 to 0.15 µm. Such a high-refractive-index layer may be obtained by dispersing metal compound fine particles into a binder component. The binder component may be, but not limited to, a general-purpose resin such as a polyester, acrylic, urethane, or epoxy resin or the hard coat component according to the invention. The metal compound particles per se have a relatively high refractive index. Examples of metal compound particles that may be used include tin-containing antimony oxide particles, zinc-containing antimony oxide particles, tin-containing indium oxide particles, zinc oxide/aluminum oxide particles, antimony oxide particles, titanium oxide particles, and zirconium oxide particles. Compounds capable of imparting an antistatic function are more preferred, and, therefore, tin-containing indium oxide particles are particularly preferred. The metal compound particles preferably have an average primary particle size (a sphere-equivalent size as measured by BET method) of 0.5 µm or less, more preferably 0.001 to 0.3 µm, in order to maintain transparency. In order to improve the electrical conductivity, an organic electrically-conductive material such as polypyrrole, polyaniline, or polythiophene may be added to the metal compound.

The low-refractive-index layer preferably has a refractive index of about 1.30 to about 1.45 and a thickness of about 0.01 to about 0.15 µm. Known materials may be used to form the low-refractive-index layer, and fluorides or perfluoroalkyl group-containing compounds are preferably used. The material may also be prepared by charging hollow fine particles into binder resin. For example, such hollow particles are described in published documents such as JP-A No. 2001-233611 and J. AM. Chem. Soc. 2003, 125, 316-317.

The antireflection film obtained by the above method preferably has a haze of 4% or less and a transmittance of 5% or less at a wavelength of 380 nm. If the transmittance at a wavelength of 380 nm is more than 5%, a near infrared light-intercepting dye or a polyester base film used as a component of a filter may be degraded during long-term use. This feature may be achieved by adding an ultraviolet ray-absorbing agent to the polyester base material, but any other method such as addition of an ultraviolet ray-absorbing agent to the pressure-sensitive adhesive layer may also be used. If the haze of the antireflection film is more than 4%, image sharpness may be affected. Therefore, the hard-coated film and the high-refractive-index layer or the low-refractive-index layer formed thereon should keep the haze as low as possible.

Examples of coating methods include, but are not limited to, micro-gravure coating, gravure coating, micro-gravure reverse coating, gravure reverse coating, die coating, comma coating, kiss coating, capillary coating, and wire bar coating. In particular, micro-gravure coating or micro-gravure reverse coating is preferred, because of its high coating thickness accuracy.

Characterization Methods and Effect Evaluation Methods

The methods described below are used for characterization and effect evaluation in the invention.

(1) Measurement of 3D Surface Profile, Arithmetical Mean Deviation of Surface Sa (Sa1 and Sa2), Kurtosis of Surface Height Distribution Sku, Arithmetical Mean Slope Angle Δa, Shape of Interface between Polyester Film and Hard Coat Layer, and Interface Projection Height The hard coat surface roughness is determined from the 3D surface profile of the hard coat surface obtained by measuring the hard coat surface with a surface profiler SP-500 (manufactured by Toray Engineering Co., Ltd.) equipped with a standard camera and a ×5 objective lens in WSI mode. The data obtained by this measurement has a visual field size of 0.80 mm×0.72 mm, an in-plane resolution of 1.6 µm, and a height resolution of 1 nm.

The arithmetical mean deviation of surface Sa and the kurtosis of surface height distribution Sku, which are 3D surface roughness parameters of the hard coat surface defined according to the invention, are obtained by analyzing the 3D surface profile (measured with SP-500) with a nanoscale 3D image processing software SPIP™ (manufactured by Image Metrology A/S).

The arithmetical mean slope angle Δa was determined by the method described below. The 3D surface profiles in two directions perpendicular to each other were each measured under the conditions described above with the surface profiler SP-500 (manufactured by Toray Engineering Co., Ltd.). As regards each of the resulting surface profiles, the operations "display result"-"measure roughness", the whole of the measured area, and the operation "measurement" were selected to calculate the values (Δa1,Δa2). The arithmetical mean slope angle Δa is the average of the values according to the formula Δa=(Δa1+Δa2)/2.

In a similar manner, the profile of the interface between the polyester film and the hard coat layer is measured with the surface profiler SP-500 (manufactured by Toray Engineering Co., Ltd.) and a ×5 objective lens in WSI mode. The profile of the interface is obtained by selecting the "back surface" of an image obtained by the operations "refractive index" 1.52 and "data processing"-"gaussian filter"-"cut high frequency" 30 µm.

The resulting curve of surface shape and the resulting curve of interface shape were vertically aligned, and the positions of the irregularities were checked.

When 10 projections of the interface coincided with 7 or more depressions of the surface, the structure was determined as having projections of the polyester film surface immediately below depressions of the hard coat surface. When 10 projections of the interface coincided with 7 or more projections of the surface, the structure was determined as having projections of the polyester film surface immediately below projections of the hard coat surface.

The interface projection height was determined by the method described below.

As regards the resulting curve of interface shape, the operations "display result"-"measure roughness", the whole of the measured area, and the operation "measurement" were selected to obtain an Rz value as the height.

(2) Abrasion Resistance

The hard coat layer surface was abraded with steel wool #0000 under different loads. Under each constant load, the surface was abraded by reciprocating the steel wool 10 times (at a rate of 10 cm/second), and the maximum load under which scratch resistance was observed (no scratch was observed) was determined. A load of 2 kg/cm² was determined as a practically acceptable level.

(3) Haze

The haze was measured using a direct-reading haze computer manufactured by Suga Test Instruments Co., Ltd. according to JIS K 7136.

(4) Heat Shrinkage Ratio (%) at 150° C. for 30 Minutes

The hard-coated film was cut into 10 mm-wide, 200 mm-long strips. A 100 mm reference line was drawn at the longitudinal center of the strip, and the strip was suspended in a 150° C. hot blast oven with 1 g of a load applied to its lower end in the longitudinal direction. In this state, the strip was allowed to stand for 30 minutes and then removed. The length (L1) of the original reference line on the sample and the length (L2) of the reference line after the treatment at 150° C. for 30 minutes were measured with precision at an order of 0.1 mm. The value $\{(L1-L2)/L1\}\times 100$ was defined as the heat shrinkage ratio of the sample. The measurement was performed at 10 points along each of the longitudinal direction of the hard-coated film-forming process and the direction perpendicular thereto, and the measurements were averaged.

(5) Presence or Absence of Interference Iris Pattern

In order to eliminate the effect of back surface reflection, the back surface opposite to the surface to be measured (the hard coat layer side surface) was roughed with sand paper No. 240 in the same manner as in the measurement of surface reflectance and mean ripple amplitude. The sample colored with a black magic marker was then placed 30 cm immediately below a three-wave type fluorescent lamp (National Palook, three-wave broad daylight type (FL 15EX-N 15W)) in a dark room. While the sample was visually observed from different observing points, evaluation was performed based on whether or not an iris pattern was visually observed.

There was no visible iris pattern: rank A

There was a very weak visible iris pattern: rank B;

There was a weak visible iris pattern: rank C; and

There was a strong clear visible iris pattern: rank D.

(6) Preparation of Antireflection Films

Antireflection films were prepared by the methods described below.

Antireflection Film A

Three parts of a coating composition containing tin-containing indium oxide particles (ITO) (35.7% in solids content, multifunctional urethane (meth)acrylate/ITO particles (30 nm in average primary particle size)=18/82) (EI-3 manufactured by Dai Nippon Toryo Co., Ltd.) was dissolved in 10 parts of n-butyl alcohol and 7 parts of isopropyl alcohol. The mixture was stirred to form a coating liquid. The coating liquid was applied to the surface of the hard coat layer with a wire bar, dried at 80° C., and then irradiated with 1.0 J/cm² ultraviolet light so that the coating layer was hardened to form a high-refractive-index layer with a thickness of about 0.1 μm and a refractive index n of 1.68.

A coating liquid was then prepared by mixing 40 parts of a coating composition containing a fluorine-containing copolymer (fluoroolefin-vinyl ether copolymer) (3% in solids content, JN-7215 manufactured by JSR Corporation), 1 part of a colloidal silica dispersion (13 nm in average primary particle size, 30% in solids content, a methyl isobutyl ketone dispersion), and 0.1 parts of another colloidal silica dispersion (100 nm in average primary particle size, 30% in solids content, a methyl isobutyl ketone dispersion). The coating liquid was applied to the electrically-conductive layer 4 with a wire bar and dried and cured at 150° C. to form a low-refractive-index layer with a thickness of about 0.1 μm and a refractive index n of 1.42, so that an antireflection film was prepared.

Antireflection Film B

The low-refractive-index layer-forming coating composition prepared for the antireflection film A was used and applied to the hard-coated film so that it would form a 0.1 μl-thick layer after drying and hardening.

Antireflection Film C

Only the hard-coated film with neither high-refractive-index layer nor low-refractive-index layer was used as an antireflection film.

(7) Surface Reflectance

The antireflection films prepared as in (6) were measured by the method described below. A spectrophotometer model U-3410 (manufactured by Hitachi, Ltd.) equipped with a 60 mmφ integrating sphere was used to measure the reflectance at an incidence angle of 10 degrees, and the minimum reflectance over the wavelength range of 400 to 750 nm was determined as the surface reflectance.

In order to eliminate the effect of back surface reflection, the back surface opposite to the surface to be measured (the hard coat layer side surface) was roughed with sand paper No. 240 and then colored with a black magic marker so that the visible light average transmittance would be reduced to 5% or less over the wavelength range of 400 to 600 nm. When the gloss of the back surface (at an incidence angle of 60° and an acceptance angle of 60°) was 10 or less after the treatment, the back surface reflection was judged to have no influence. The gloss was measured using a digital variable gloss meter UGV-5B (manufactured by Suga Test Instruments Co., Ltd.) according to JIS Z 8741.

(8) Coloration Irregularity Associated with Reflected Light

The prepared antireflection films were used and evaluated for the coloration irregularity of reflected light by the same method as for (5) evaluation of the presence or absence of interference iris patterns, according to the criteria below.

There was no coloration irregularity: There was no coloration change observed in an evaluation area of 50 cm square: excellent;

There was slight coloration irregularity: There was coloration change observed in an evaluation area of at least 30 cm square and less than 50 cm square: good;

There was weak coloration irregularity: There was coloration change observed in an evaluation area of at least 10 cm square and less than 30 cm square: acceptable; and There was strong coloration irregularity: There was coloration change observed in an evaluation area of less than 10 cm square: poor.

(9) Clear View Properties (Transmitted Image Sharpness)

The antireflection film was cut into A4 size pieces. The film piece was fixed to the front face of the screen of a PDP television (TH-42PX500 manufactured by Panasonic Corporation) placed in a dark room with cellophane tapes attached to the four corners of the film piece in such manner that the antireflection surface was placed on the viewer side. While an image was displayed on the screen of the television, the transmitted image at the portion to which the antireflection film was attached and the transmitted image at the portion with no antireflection film were observed from a place 1.5 m apart from the front face of the television and compared as to whether the transmitted image was degraded.

The transmitted image was clearly visible with no degradation: excellent;
The transmitted image was slightly blurred: good;
The transmitted image was blurred and less visible: acceptable; and
The transmitted image was not visible: poor.

(10) Transmittance at 380 nm

The transmittance of the antireflection film was determined at 380 nm with a spectrophotometer U-3410 (manufactured by Hitachi, Ltd.) equipped with a 460 integrating sphere 130-063 (manufactured by Hitachi Ltd.) and a 10-degree tilt spacer, and measurements at 10 points were averaged.

(11) Reflection-Reducing Effect 1

The antireflection film was cut into A4 size pieces. The film piece was fixed to the front face of the screen of a PDP television (TH-42PX500 manufactured by Panasonic Corporation) with cellophane tapes attached to the four corners of the film piece in such manner that the antireflection surface was placed on the viewer side. Room lighting was set at 400 to 500 lx, and the image of the viewer reflected on the front face of the television was observed from a place 1.5 m apart from the television in the off-state of the television.

The portion to which the antireflection film was attached was compared with the portion with no film based on the following criteria.
The outline of the eyes of the observer was not visible: excellent;
The outline of the eyes of the observer was barely visible, but the image was not sharp as compared with the portion with no film: good; and
The outline of the eyes of the observer was visible: poor.

(12) Reflection-Reducing Effect 2

Reflection of a fluorescent lamp on the screen was evaluated in a similar manner to that described in the article (11) under the lamp remaining on in a room based on the criteria below.
The outline of the fluorescent lamp was completely blurred: excellent;
The outline of the fluorescent lamp was blurred: good; and
The fluorescent lamp was not blurred, and its outline was clearly visible: poor.

(13) Screen Glittering

The same setting as in (11) was used. The television was turned on, and "green" patterns were displayed on the screen. The degree of screen glittering was observed in the normal direction and visually evaluated according to the criteria below.
There was no screen glittering: excellent;
The screen slightly glittered: good; and
The screen significantly glittered: poor.

EXAMPLES

The invention is more specifically described with the examples below, but not limited thereto.

Hard coat layer-forming coating compositions were prepared as described below.

H-1
Main Component:
A mixture of dipentaerythritol hexaacrylate and dipentaerythritol pentaacrylate (KAYARAD-DPHA manufactured by Nippon Kayaku Co., Ltd.) 70% by weight;
Trimethylolpropane ethylene oxide-modified triacrylate (ARONIX (registered trademark) M-350 manufactured by Toagosei Co., Ltd.) 10% by weight; and
Completely alkylated melamine (Cymer 303 manufactured by Nippon Cytec Industries) 20% by weight
Based on 100 parts by weight of the main component,
Catalyst: Catalyst 602 (manufactured by Nippon Cytec Industries) 1 part by weight; and
Leveling agent: ARUFON-UP1000 (registered trademark) manufactured by Toagosei Co., Ltd. 0.2 parts by weight
Viscosity of the coating composition: 2000 mPa·s at 25° C.; 150 mPa·s at 100° C.

H-2
Main Component:
A mixture of dipentaerythritol hexaacrylate and dipentaerythritol pentaacrylate (KAYARAD-DPHA manufactured by Nippon Kayaku Co., Ltd.) 40% by weight;
Trimethylolpropane ethylene oxide-modified triacrylate (ARONIX M-350 manufactured by Toagosei Co., Ltd.) 40% by weight; and
Completely alkylated melamine (Cymer 303 manufactured by Nippon Cytec Industries) 20% by weight
Additives:
Based on 100 parts by weight of the main component,
Catalyst: Catalyst 602 (manufactured by Nippon Cytec Industries) 1 part by weight; and
Leveling agent: ARUFON-UP1000 (manufactured by Toagosei Co., Ltd.) 0.2 parts by weight
Viscosity of the coating composition: 800 mPa·s at 25° C.; 60 mPa·s at 100° C.

H-3
Main Component:
A mixture of dipentaerythritol hexaacrylate and dipentaerythritol pentaacrylate (KAYARAD-DPHA manufactured by Nippon Kayaku Co., Ltd.) 20% by weight;
Trimethylolpropane ethylene oxide-modified triacrylate (ARONIX M-350 manufactured by Toagosei Co., Ltd.) 60% by weight; and
Completely alkylated melamine (Cymer 303 manufactured by Nippon Cytec Industries) 20% by weight
Additives:
Based on 100 parts by weight of the main component,
Catalyst: Catalyst 602 (manufactured by Nippon Cytec Industries) 1 part by weight; and
Leveling agent: ARUFON-UP1000 (manufactured by Toagosei Co., Ltd.) 0.2 parts by weight
Viscosity of the coating composition: 600 mPa·s at 25° C.; 40 mPa·s at 100° C.

H-4
Main Component:
A mixture of dipentaerythritol hexaacrylate and dipentaerythritol pentaacrylate (KAYARAD-DPHA manufactured by Nippon Kayaku Co., Ltd.) 60% by weight;
Trimethylolpropane ethylene oxide-modified triacrylate (ARONIX M-350 manufactured by Toagosei Co., Ltd.) 10% by weight;
Polyethylene glycol diacrylate (ARONIX M-240 manufactured by Toagosei Co., Ltd.) 10% by weight; and
Completely alkylated melamine (Cymer 303 manufactured by Nippon Cytec Industries) 20% by weight
Additives:
Based on 100 parts by weight of the main component,
Catalyst: Catalyst 602 (manufactured by Nippon Cytec Industries) 1 part by weight; and
Leveling agent: ARUFON-UP1000 (manufactured by Toagosei Co., Ltd.) 0.2 parts by weight Viscosity of the coating composition: 1300 mPa·s at 25° C.; 100 mPa·s at 100° C.

Example 1

Polyethylene terephthalate (hereinafter referred to as PET, with an intrinsic viscosity of 0.65 dl/g) chips were sufficiently dried under vacuum at 180° C. for 3 hours and then fed to a melt extruder. After the chips were melted at 285° C., the melt was extruded into a sheet through a T-shaped die. The sheet was cooled and solidified on a rotating mirror-surface casting drum with a surface temperature of 20° C. by static electricity-applying casting method so that an unstretched sheet was prepared. The resulting unstretched sheet was continuously stretched in the longitudinal direction. In the longitudinal stretching process, the sheet was first preheated at 75° C. with a group of sequentially arranged rolls and then heated with a roll at 95° C. and stretched 3.5 times, while the film surface was heated with a radiation heater. The drum surface side of the film had a refractive index of 1.645 and a crystallinity of 19% as measured by Raman method. The hard coat layer-forming coating composition (H-1) was applied in a thickness of 20 μm to the drum surface side of the film by metabar method. The film was then continuously introduced into a tenter, while both ends of the film were fixed. After the film was preheated at 70° C. for 15 seconds, the film was slightly stretched 1.2 times in the transverse direction at 75° C. and then stretched 3.3 times in the transverse direction at 95° C. The film was continuously heat-treated in a heat treatment zone at 220° C. for 25 seconds, while the coating layer was hardened and while the film was relaxed by 5%.

The resulting hard-coated film had a hard coat layer with a thickness of 5 μm.

In the hard-coated film, the hard coat surface and the PET film surface in contact with the hard coat layer each had irregularities, and projections of the hard coat layer surface coincided with depressions of the PET film surface. Sa and Sku of the hard coat surface was 41 nm and 2.2, respectively.

The hard-coated film in the scope of the invention had a high level of abrasion resistance and was completely free from interference iris patterns. The hard coat surface of the hard-coated film was subjected to the process according to (6) Preparation of Antireflection Films in the Section of "Characterization Methods and Effect Evaluation Methods," so that an antireflection film A was prepared.

As shown in Table 2, the antireflection film had neither coloration irregularity nor screen glittering and had a high level of clear view properties and the effect of suppressing reflection.

Examples 2 and 3

Hard-coated films were prepared using the process of Example 1, except that the hard coat layer-forming coating composition H-2 (Example 2) or H-4 (Example 3) was used instead. In the hard-coated films, Sa and Sku of the hard coat surface was 18 nm and 1.6 (Example 2), respectively, and 56 nm and 1.9 (Example 3), respectively. Example 2 was slightly inferior in surface hardness and interference iris pattern but sufficiently free from practical problems. These films were used to form antireflection films in the same manner as in Example 1. As shown in Table 2, the antireflection films had properties sufficiently practical in terms of coloration irregularity, clear view properties, and suppressing of screen glittering and reflection.

The hard-coated film of Example 3 was used to form antireflection films B and C. As shown in Table 2, the antireflection films were slightly reduced in the reflection-suppressing effect but practically free from problems.

Examples 4 to 6 and Comparative Example 1

Hard-coated films were prepared using the process of Example 3, except that after the hard coat layer was hardened under the relaxation by 5% in the heat treatment zone, the film was further continuously relaxed at 230° C. for 15 seconds by 3% (Example 4), 5% (Example 5), 7% (Example 6), or 10% (Comparative Example 1). As shown in Table 1, the hard coated films differed in Sa of the hard coat layer surface depending on the degree of the relaxation, and the relaxation by 10% produced Sa of 163 nm. The hard-coated films each had a structure in which projections of the hard coat surface coincided with projections of the PET film surface. The hard-coated film obtained in each of Examples 4 to 6 and Comparative Example 1 had sufficient abrasion resistance and is free from interference iris patterns. Each of these hard-coated films was used to form an antireflection film according to Examples 1 and 3. The effect of suppressing reflection was particularly high in Examples 4 to 6 where Sa and Sku of the hard coat layer surface fell within the range according to the invention. When Sa of the hard coat layer surface exceeded the range (Comparative Example 1), an increase in haze was observed, the transmitted image became slightly unclear, and screen glittering was significant.

Comparative Example 2

A hard-coated film was prepared using the process of Example 1, except that the hard coat layer-forming coating composition H-3 was used instead. The hard-coated film had irregularities. However, Sa and Sku were relatively small due to the coating composition, and it had insufficient surface hardness and a visible interference iris pattern. The hard coated film was used to form an antireflection film A in the same manner as in Example 1. The antireflection film had highly visible coloration irregularity, and its reflection-suppressing effect was insufficient.

Comparative Example 3

A hard-coated film was prepared using the process of Example 1, except that the slight stretching temperature was 95° C. As shown in Table 1, the hard-coated film had no irregularities on the hard coat layer surface or on the PET film surface, and Sa and Sku were less than the range. It also had a clearly-visible interference iris pattern. The hard-coated film was used to form an antireflection film A in the same manner as in Example 1. As shown in Table 2, the resulting antireflection film had significant coloration irregularity and showed significant reflection.

Comparative Example 4

A hard-coated film was prepared using the process of Example 1, except that the relaxation was not performed in the heat treatment zone during the hardening of the hard coat layer. Since the relaxation was not performed in response to the hardening and shrinkage of the hard coat layer, the film had cracks in the hard coat layer and was practically unusable.

Comparative Example 5

An adhesive polyester film (Lumirror (registered trademark) U46 manufactured by Toray Industries, Inc.) was used.

The hard coat layer-forming coating composition shown below was applied to the film, then dried at 80° C. for 1 minute, and irradiated with 350 mJ/cm² of ultraviolet rays, so that a hard-coated film with a 5 μm-thick hard coat layer was prepared.

Hard Coat Layer-Forming Coating Composition:
A mixture of dipentaerythritol hexaacrylate and dipentaerythritol pentaacrylate (KAYARAD-DPHA manufactured by Nippon Kayaku Co., Ltd.) 30% by weight;
Trimethylolpropane ethylene oxide-modified triacrylate (ARONIX M-350 manufactured by Toagosei Co., Ltd.) 15% by weight;
Polyester acrylate (ARONIX M7100 manufactured by Toagosei Co., Ltd.) 4% by weight;
Photopolymerization initiator (Irgacure 184 manufactured by Ciba Specialty Chemicals Inc.) 1% by weight;
Toluene 25% by weight; and
Methyl ethyl ketone 25% by weight.

In the hard-coated film, both the hard coat layer surface and the PET film surface were flat, and Sa and Sku of the hard coat layer surface were each less than the range according to the invention. An interference iris pattern was clearly observed in the hard-coated film. The hard-coated film was used to form an antireflection film A in the same manner as in Example 1. The antireflection film was inferior because of significant coloration irregularity and reflection.

Comparative Examples 6 and 7

Hard-coated films were prepared using the process of Comparative Example 5, except that based on 100 parts by weight of the hard coat layer-forming compositions (exclusive of the solvents), 1 part by weight (Comparative Example 6) or 5 parts by weight (Comparative Example 7) of styrene-acrylic crosslinked organic particles with an average particle size of 5 μm and a particle refractive index of 1.52 were added to the hard coat-forming coating composition. The hard-coated films each had projections formed by the particles in the hard coat layer and had Sa of 351 nm (Comparative Example 6) and Sa of 260 nm (Comparative Example 7), and an Sku of 2.9 (Comparative Example 6) and an Sku of 6.5 (Comparative Example 7), respectively. The hard-coated films were each used to form an antireflection film A, B, or C in the same manner as in Example 3. The characteristics of the resulting antireflection films are shown in Table 2. The antireflection film produced with the hard-coated film of Comparative Example 6 or 7 showed significant screen glittering, regardless of the structure. The antireflection film using hard-coated film of Comparative Example 7 containing a relatively large amount of particles had a high haze and made the transmitted image blurred.

Examples 7 and 8 and Comparative Example 8 and 9

Hard-coated films were prepared using the process of Example 1, except that the draw ratio and the stretching temperature in the longitudinal stretching process were changed so that a longitudinally-stretched film with a refractive index of 1.615 and a crystallinity of 12% (Comparative Example 8), a refractive index of 1.625 and a crystallinity of 18% (Comparative Example 9), a refractive index of 1.63 and a crystallinity of 17% (Example 7), or a refractive index of 1.655 and a crystallinity of 22% (Example 8) was used. In Comparative Example 8, the interface had no irregularities. In Comparative 9, the interface has irregularities, but Sa and Sku of the hard coat surface was not sufficient. An interference iris pattern was observed in both cases. In contrast, the hard-coated films prepared under the conditions of Examples 7 and 8, respectively, each had satisfactory irregularities and Sa and Sku each falling within the range according to the invention. The hard-coated films were each used to form an antireflection film A in the same manner as in Example 1. As shown in Table 2, the antireflection films of Comparative Examples 8 and 9 each had Sa and Sku each falling outside the range according to the invention and were insufficient in terms of the effect of suppressing coloration irregularity and reflection. The antireflection films produced with the hard-coated films of Examples 7 and 8 with Sa and Sku each falling within the range according to the invention each had practically satisfactory Characteristics.

Example 9

A hard-coated film was prepared using the process of Example 1, except that the PET chips were replaced with PET (with an intrinsic viscosity of 0.63 dl/g) chips containing 0.8 wt % of Cyasorb (registered trademark) 3638 (manufactured by Cytec Industries Inc.) as an ultraviolet ray-absorbing agent. As shown in Table 1, the hard-coated film had satisfactory Sa and Sku of the hard coat surface and also had a transmittance of 2.6% at a wavelength of 380 nm. The hard-coated film was used to form an antireflection film A in the same manner as in Example 1. As shown in Table 2, all the characteristics of the antireflection film reached a practical level, and the antireflection film had the effect of blocking ultraviolet rays.

TABLE 1

| | Presence or absence of interface irregularities Presence: ○ Absence: — | Presence or absence of surface irregularities Presence: ○ Absence: — | Relationship between surface/interface irregularities Projections/ depressions: A Projections/ projections: B | Surface Sa (Sa1) (nm) | Interface Sa (Sa2) (nm) | Sa2/Sa1 | Surface Sku | Surface Δa | Haze (%) | Heat shrinkage ratio at 150° C. for 30 minutes (%) | Abrasion resistance (kg/cm²) | Presence or absence of interference iris pattern |
|---|---|---|---|---|---|---|---|---|---|---|---|---|
| Example 1 | ○ | ○ | A | 41 | 305 | 7.4 | 2.2 | 0.38 | 1.4 | 1.9 | 2.7 | A |
| Example 2 | ○ | ○ | A | 18 | 274 | 15.2 | 1.6 | 0.24 | 0.8 | 1.8 | 2.1 | B |
| Example 3 | ○ | ○ | A | 56 | 316 | 5.6 | 1.9 | 0.42 | 1.7 | 1.8 | 2.6 | A |
| Example 4 | ○ | ○ | B | 74 | 324 | 4.4 | 2.5 | 0.46 | 1.8 | 0.7 | 2.7 | A |
| Example 5 | ○ | ○ | B | 96 | 331 | 3.4 | 2.8 | 0.57 | 2.1 | 0.2 | 2.7 | A |
| Example 6 | ○ | ○ | B | 121 | 343 | 2.8 | 3.1 | 0.68 | 2.9 | 0.1 | 2.6 | A |
| Comparative Example 1 | ○ | ○ | B | 163 | 358 | 2.2 | 3.7 | 0.77 | 4.4 | 0.0 | 2.5 | A |
| Comparative Example 2 | ○ | ○ | A | 14 | 186 | 13.2 | 1.3 | 0.11 | 0.7 | 1.9 | 1.3 | C |

TABLE 1-continued

| | Presence or absence of interface irregularities Presence: ○ Absence: — | Presence or absence of surface irregularities Presence: ○ Absence: — | Relationship between surface/interface irregularities Projections/depressions: A Projections/projections: B | Surface Sa (Sa1) (nm) | Interface Sa (Sa2) (nm) | Sa2/Sa1 | Surface Sku | Surface Δa | Haze (%) | Heat shrinkage ratio at 150° C. for 30 minutes (%) | Abrasion resistance (kg/cm²) | Presence or absence of interference iris pattern |
|---|---|---|---|---|---|---|---|---|---|---|---|---|
| Comparative Example 3 | — | — | — | 8 | 152 | 19.0 | 1.1 | 0.08 | 0.6 | 1.8 | 2.7 | D |
| Comparative Example 4 | | | | Hard coat layer cracking | | | | | | | | |
| Comparative Example 5 | — | — | — | 7 | 7 | 1 | 1.1 | 0.05 | 0.8 | 0.8 | 2.6 | D |
| Comparative Example 6 | — | ○ | — | 351 | 10 | 0.03 | 2.9 | 1.29 | 2.6 | 0.8 | 2.7 | A |
| Comparative Example 7 | — | ○ | — | 260 | 10 | 0.04 | 6.5 | 1.83 | 8.5 | 0.8 | 2.7 | A |
| Comparative Example 8 | — | — | — | 8 | 13 | 1.6 | 1.1 | 0.08 | 0.6 | 1.8 | 2.8 | D |
| Comparative Example 9 | ○ | ○ | A | 13 | 148 | 11.4 | 1.2 | 0.11 | 0.7 | 1.7 | 2.8 | C |
| Example 7 | ○ | ○ | A | 29 | 286 | 9.9 | 1.7 | 0.28 | 1.2 | 1.7 | 2.7 | B |
| Example 8 | ○ | ○ | A | 63 | 321 | 5.1 | 2.6 | 0.40 | 1.5 | 1.7 | 2.7 | A |
| Example 9 | ○ | ○ | A | 44 | 311 | 7.1 | 2.1 | 0.37 | 1.6 | 1.8 | 2.7 | A |

TABLE 2

| | Antireflection film | Surface reflectance (%) | Haze (%) | Coloration irregularity | Clear view properties (transmitted image sharpness) | Transmittance (%) at wavelength of 380 nm | Reflection-reducing effect 1 | Reflection-reducing effect 2 | Screen glittering |
|---|---|---|---|---|---|---|---|---|---|
| Example 1 | A | 1.2 | 1.8 | Excellent | Excellent | — | Good | Good | Excellent |
| Example 2 | A | 1.0 | 1.4 | Good | Excellent | — | Good | Good | Excellent |
| Example 3 | A | 1.3 | 2.2 | Excellent | Good | — | Excellent | Good | Excellent |
| | B | 1.5 | 2.0 | Excellent | Excellent | — | Excellent | Good | Excellent |
| | C | 3.9 | 1.7 | Excellent | Excellent | — | Good | Excellent | Excellent |
| Example 4 | A | 1.3 | 2.3 | Excellent | Good | — | Excellent | Excellent | Excellent |
| Example 5 | A | 1.4 | 2.4 | Excellent | Good | — | Excellent | Excellent | Excellent |
| | B | 2.4 | 2.3 | Excellent | Good | — | Excellent | Excellent | Excellent |
| | C | 3.9 | 2.1 | Excellent | Good | — | Excellent | Excellent | Excellent |
| Example 6 | A | 1.5 | 3.2 | Excellent | Good | — | Excellent | Excellent | Good |
| Comparative Example 1 | A | 1.5 | 4.6 | Excellent | Acceptable | — | Excellent | Excellent | Acceptable |
| | B | 2.7 | 4.5 | Excellent | Acceptable | — | Excellent | Excellent | Acceptable |
| | C | 4.0 | 4.4 | Excellent | Acceptable | — | Excellent | Excellent | Acceptable |
| Comparative Example 2 | A | 0.9 | 1.2 | Acceptable | Excellent | — | Acceptable | Acceptable | Excellent |
| Comparative Example 3 | A | 0.9 | 1.0 | Poor | Excellent | — | Poor | Poor | Excellent |
| Comparative Example 4 | — | — | — | — | — | — | — | — | — |
| Comparative Example 5 | A | 0.8 | 1.1 | Poor | Excellent | — | Poor | Poor | Excellent |
| Comparative Example 6 | A | 1.6 | 3.0 | Excellent | Good | — | Excellent | Excellent | Poor |
| | B | 2.7 | 2.7 | Excellent | Good | — | Excellent | Excellent | Poor |
| | C | 5.1 | 2.6 | Excellent | Good | — | Excellent | Excellent | Poor |
| Comparative Example 7 | A | 1.8 | 9.1 | Excellent | Poor | — | Excellent | Excellent | Poor |
| | B | 2.8 | 8.8 | Excellent | Poor | — | Excellent | Excellent | Poor |
| | C | 4.9 | 8.5 | Excellent | Poor | — | Excellent | Excellent | Poor |
| Comparative Example 8 | A | 0.8 | 1.1 | Poor | Excellent | — | Poor | Poor | Excellent |
| Comparative Example 9 | A | 0.9 | 1.3 | Acceptable | Excellent | — | Acceptable | Acceptable | Excellent |
| Example 7 | A | 1.1 | 1.6 | Good | Excellent | — | Good | Good | Excellent |
| Example 8 | A | 1.4 | 1.9 | Excellent | Excellent | — | Excellent | Good | Excellent |
| Example 9 | A | 1.3 | 2.0 | Excellent | Excellent | 2.6 | Good | Good | Excellent |

Antireflection films A to C: The antireflection films were prepared using each of the films prepared in Examples 1 to 9 and Comparative Examples 1 to 9 according to (6) Preparation of Antireflection Films in the section of "Characterization Methods and Effect Evaluation Methods."

INDUSTRIAL APPLICABILITY

The hard-coated film of the invention has good adhesion to the hard coat layer and high light resistance and is substantially free from interference iris patterns. When used for an antireflection film, the hard-coated film can effectively reduce screen glittering and external light reflection without loss of image sharpness. Therefore, the hard-coated film is useful as an antireflection film substrate for liquid crystal displays, plasma displays, or the like, or as a base film for touch panels, window films, solar battery members, nameplates, or the like.

The invention claimed is:

1. A hard-coated film, comprising:
a polyester film; and
a hard coat layer placed on at least one side of the polyester film, wherein
the hard coat layer comprises a multi-functional acrylate, another monofunctional or bifunctional acrylate, and a melamine-based crosslinking agent,
the hard-coated film has a heat shrinkage ratio of at most 0.8% at 150° C. for 30 minutes in at least one direction,
the hard coat layer has a surface with irregularities,
an interface between the polyester film and the hard coat layer has irregularities on the polyester film side, such that projections of the irregularities on the polyester film side coincide with projections of the hard coat surface profile in the thickness direction, and
the surface of the hard coat layer has 3D surface roughness parameters comprising an arithmetical mean deviation of surface Sa of from 15 nm to less than 150 nm and a kurtosis of surface height distribution Sku of from 1.5 to 5.

2. The hard-coated film of claim 1, wherein the interface between the polyester film and the hard coat layer has irregularities on the polyester film side, and projections of the irregularities on the polyester film side coincide with depressions of the hard coat surface profile in a thickness direction.

3. The hard-coated film of claim 1, wherein the hard coat layer is a thermally hardened layer.

4. The hard-coated film of claim 1, wherein the polyester film contains ultraviolet ray-absorbing agents.

5. The hard-coated film of claim 1, wherein the irregularities of the hard coat layer are formed without the aid of particles in the hard coat layer and the polyester film.

6. The hard-coated film of claim 1, wherein the hard coat layer surface has an average $\Delta a$ of from 0.2 degrees to 1.0 degree, wherein the average $\Delta a$ is calculated from the formula $\Delta a = (\Delta a1 + \Delta a2)/2$, wherein $\Delta a1$ and $\Delta a2$ are arithmetical mean slope angles of the hard coat layer surface in two directions perpendicular to each other, respectively.

7. The hard-coated film of claim 1, wherein the hard coat layer surface has an Sa2/Sa1 ratio of from 2 to 20, wherein Sa1 is the arithmetical mean deviation of surface (Sa) of the hard coat layer surface, and Sa2 is the arithmetical mean deviation of surface (Sa) of the interface between the polyester film and the hard coat layer, concerning the 3D surface roughness parameters.

8. The hard-coated film of claim 1, wherein Sku of the hard coat layer is from 1.5 to 3.

9. The hard-coated film of claim 1, wherein the hard-coated film has a haze of less than 3%.

10. An antireflection film, comprising:
the hard-coated film of claim 1; and
a low-refractive-index layer with a refractive index of at most 1.45 that is formed on the hard coat layer of the hard-coated film, optionally with a high-refractive-index layer with a refractive index of at least 1.55 interposed between the hard coat layer and the low-refractive-index layer.

11. The antireflection film of claim 10, wherein it has a haze of less than 4% and a transmittance of at most 5% at a wavelength of 380 nm.

* * * * *